United States Patent [19]

Jensen, Jr.

[11] Patent Number: 4,549,917
[45] Date of Patent: Oct. 29, 1985

[54] DIE CUT WINDOW LAMINATING DEVICE

[75] Inventor: James W. Jensen, Jr., Boulder, Colo.

[73] Assignee: Adolph Coors Company, Golden, Colo.

[21] Appl. No.: 462,917

[22] Filed: Feb. 1, 1983

[51] Int. Cl.[4] .............................................. B32B 31/18
[52] U.S. Cl. .................................... 156/108; 156/252; 156/256; 156/263; 156/353; 156/356; 156/390; 156/514; 156/517; 156/529
[58] Field of Search ............... 156/108, 252, 253, 256, 156/263, 353, 356, 390, 513, 514, 517, 529, 361; 53/170, 172, 175; 206/158, 160, 627; 428/204, 205, 215

[56] References Cited

U.S. PATENT DOCUMENTS

| | | | |
|---|---|---|---|
| 2,284,872 | 6/1942 | Jaeger et al. | 156/514 |
| 2,511,303 | 6/1950 | Stevens et al. | 156/108 |
| 3,459,625 | 8/1969 | Heller et al. | 156/256 |
| 3,565,730 | 2/1971 | Weisshuhn | 156/514 |
| 4,254,173 | 3/1981 | Peer | 428/204 |

FOREIGN PATENT DOCUMENTS 1168539  10/1969  United Kingdom ............... 156/108

Primary Examiner—Caleb Weston
Attorney, Agent, or Firm—Klaas & Law

[57] ABSTRACT

A device for forming a moving web of laminated composite material having window portions therein from a moving continuous web of plastic film material and a moving continuous web of paper material. The device comprises cutter means for repeatingly cutting spaced apart perforated window patterns in the paper web and a wetting means for wetting the film web at spaced apart target areas having shapes substantially identical to the perforated window patterns. The device further comprises phasing means having both a coarse mode and a fine mode of operation for providing accurate registry of the perforated window patterns and the wetted target areas. A wetting synchronization means is also described which synchronizes the wetting means with the film target areas whereby the target areas and only the target areas are wetted by the wetting means. Means for removing a paper chad portion from the perforated window patterns subsequent to lamination is also described.

35 Claims, 9 Drawing Figures

| BLOCK DIAGRAMS | DESCRIPTION |
|---|---|
| $r_1 \xrightarrow{+} \bigotimes \xrightarrow{e = r_1 - c + r_2}$ with $r_2$ (+) in and $c$ (−) in | SUMING JUNCTION — ADDITION & SUBTRACTION OF SIGNALS HAVING THE SAME UNITS |
| $a, b \to \boxed{X} \to (a) \times (b) = c$ | MULTIPLICATION — VARIBLES "a" & "b" TO FORM "c" |
| $R(s) \to \boxed{G(s)} \to C(s)$ | $C(s) = R(s) G(s)$ — THE OUTPUT FUNCTION $C(s)$ IS DIRECTLY DEPENDANT ON THE TRANSFER FUNCTION OF THE COMPONENT $G(s)$ & THE DRIVING FUNCTION $R(s)$ |
| $a \to \boxed{A} \to b$ | SIGNAL OUTPUT "b" IS EQUAL TO THE AMPLIFIED SIGNAL OF THE INPUT ("a") (A) = b |

FIG. 9

DIE CUT WINDOW LAMINATING DEVICE

BACKGROUND OF THE INVENTION

The present invention relates generally to the production of a laminated composite sheet material and more particularly to the production of a film paper laminated composite having transparent window portions therein.

Lamination of a plastic film material to a paper material has been found to be particularly advantageous where paper products having high strength and abrasion resistant qualities are required. Such laminated composites are particularly desirable in the packaging industry, where artwork may be printed on the interior side of the plastic film to produce a high quality display package. The construction and use of such laminated composites are described in Peer, U.S. Pat. No. 4,254,173 which is hereby incorporated by reference for all that it teaches.

In producing a laminated composite of the type described in Peer, both the plastic film material and the paper material may be provided in continuous sheets from spools. The paper and the plastic film generally pass over a number of roller type devices where each of the materials are independently stretched out under tension and treated as necessary depending upon the particular end use for the laminated composite. For example the plastic material may be irradiated in conventional processes to increase its strength or improve its printability. In preferred embodiments the plastic is printed with various graphics and provided with a metalized background over the graphics to enhance the package appearance. The paper may undergo treatment as well such as being electrostatically charged to aid in the bonding process. Either the film material or the paper material or both are treated thereafter with suitable adhesive to provide a bond between the paper and film. To complete the laminating process, the paper and film material are pressed together between opposed rollers to produce a smooth flat composite. Various heating or cooling processes may also be required to ensure proper adhesion of the surfaces, depending on the type of the film, paper, and adhesive agent which are being used in the process. The end product of the process is a laminated composite which may be fed directly to cutting dies or other machines for further processing. The composite may also be taken up directly on a separate spool for storage and later processing.

The use of paperboard containers having window portions therein is well known in the packaging industry. Using prior art packaging techniques, such windows were generally formed by first cutting a window opening in a paperboard piece, providing a transparent plastic "window pane" sheet of a size slightly larger than the periphery of the window opening, and then bonding the window pane sheet to the periphery of the window opening of the paperboard piece to form the window portion of a later assembled container. The cutting of the paperboard window opening, the cutting of the window pane sheet and gluing of the sheet to the paperboard, generally take place in a series of isolated steps which are quite time consuming in known prior art apparatus. The container packaging formed by such prior art methods, although comprising window portions, does not have the desirable physical characteristics of packaging formed from the composite material of the Peer invention due to the fact that the "window pane" material covers only an isolated portion of the package and therefore does not provide composite characteristics.

Although composite packing materials of the type described in Peer provide superior strength and esthetic display characteristics as compared to conventional paperboard packaging material, such composites were, until the present invention, unable to be produced at production line speeds with transparent window portions. A problem with window creation inherent in the production of composite material is that the adhesive used to bond the film and paper causes a discoloring of the film which is very apparent in a clear plastic window. Another problem is that the film material used in composite formation is generally printed with graphics and therefore, the windows must be provided at a fixed position relative to the graphics. A further problem lies in the fact that both the paper web and film web used in high speed composite production are to some degree extensible and difficult to align if exact registry between film portions and paper portions is required.

A need exists for a method and apparatus for producing laminated composite having transparent window portions. Such a composite should retain the superior strength and exterior display characteristics of film paper composite packaging material while providing a means for consumers to visually inspect the product enclosed within the container. The apparatus used to make a composite with window portions should be a production apparatus capable of producing the composite in a high speed cost effective manner.

SUMMARY OF THE INVENTION

The present invention comprises an apparatus and method for forming a laminated composite having transparent window portions therein. The apparatus processes film material and paper material provided in continuous web form to create a continuous web of composite material having window portions at predetermined spacing. The composite material thus formed may be taken up on a composite spool or the like for convenient storage and transportation or may be provided directly to other apparatus for additional process steps leading to the formation of container packages having transparent display windows.

The apparatus comprises a paper supply means and a film supply means for supplying a continuous moving web of paper material and a continuous moving web of film material to laminating roll means. Immediately prior to entry of the film web and paper web into the laminating roll means one or both of the surfaces to be bonded is/are coated with an adhesive agent provided by an adhesive supply mean. The laminating roll means apply compressive pressure to the moving paper and film webs by which they are adhesively bonded together to form a moving laminated composite web.

The film material prior to entering the adhesion coating means or the laminating means is provided with wetted areas on the side thereof to be laminated to the paper. The wetting of the film is provided at predetermined target areas which have a fixed spacial relationship to preprinted graphics provided on the film. Identical sets of graphics with identical target areas are provided on the film at predetermined spacing hereinafter referred to as repeat lengths. Printing means or other wetting means are used to place the wetting agent at the predetermined target area on each set of graphs. Film monitoring means are used to detect the relative position of the film target areas with respect to the position of the printing means and a film monitoring signal generated by the film monitoring means is used by a printing control means to operably register the printing means with the film target areas.

In one preferred embodiment the printing means comprises a printing roll rotated about a shaft driven by the same drive means as the laminating roll means. The printing control means comprises differential motor means for adding or subtracting rotational speed to the printing means relative to the speed of the laminating means. The film monitoring means may comprise photoelectric sensing means for sensing spaced apart printed marks on the film.

The paper web prior to passing through the adhesive supply means or laminating means passes through a die cut roll means which cuts perforated window patterns in the paper board at spaced apart intervals. The size and shape of the perforated patterns are essentially identical to the wetted pattern printed on the film target areas, and the spacing between patterns on the paper web is nominally the same as that of the spacing of target areas on the film web. The present invention provides registry between the target areas on the film and the patterns on the paper at the laminating nip by use of a phasing means which adjusts the longitudinal position at which the perforated patterns are cut in the paper web and thereby adjusts the relative position of the perforated pattern "chain" relative the target area "chain". "Chain" as used herein will refer to a series of perforated patterns or target areas having equal spacing throughout as opposed to a single perforated pattern or target area. In a coarse phasing mode the phasing adjustment is accomplished by temporarily separating a cutter roll and backing roll which form a cutting roll nip and then increasing or decreasing the speed of the cutting roll for a short period of time to put it in phase with the film target areas as it cuts the paper web. In a fine phasing mode phasing is accomplished through selectively increasing or decreasing the tension in the paper in a selected control portion between the cutting means and laminating means.

In a preferred embodiment the fine mode of the phasing means comprises paper entry roll means which form an entry nip positioned on the paper web up stream of the rotary cutter means. The speed of the entry roll means may be selectively varied relative to the rotary speed of the cutter roll means whereby the tension in a control portion of the paper web positioned between the cutter roll nip and entry nip may be selectively varied. The tension in the paper control portion between the entry nip and the cutting nip is varied relative to a constant tension provided in the paper web between the cutting nip and the laminating nip. Thus if a paper web control portion positioned between the entry nip and the cutting nip has a higher tension than the paper web portion between the cutting nip and the laminating nip, the paper in the control portion relaxes (shortens) as it proceeds from the cutting nip to the laminating nip and thereby decreasing the distance between perforated patterns positioned therein thus moving the entire perforated pattern chain forward relative the target area chain. The opposite effect, (i.e. shifting the perforated pattern chain backward relative the target area chain) is achieved by initially relaxing a paper web control portion prior to entering the cutter roll means.

A perforated pattern sensing means is provided at a point near the laminating nip whereby the spacing of the perforated patterns relative the film wetted target areas may be determined by comparison of a signal generated thereby to the film monitoring means signal. This comparison is used to regulate the paper entry nip control means and a rotary cutter control means whereby the tension differential of the fine phasing means, and the cutter roll speed change of the coarse phasing means are controlled to pace the perforated patterns in proper registry with the film target areas.

In the preferred embodiment the various monitoring means signals and input and output signals from the various control means are processed by a processing means which may comprise a microprocessor computer.

In the preferred embodiment of the invention the paper portion within the perforation cut by the cutter means, hereinafter "chad", remains on the paper web until completion of the laminating process. The adhesive agent thus adheres to the chad during the lamination process leaving the associated film wetted target area free of adhesive when the chad is removed due both to the fact that the wetted surface of the film presents a poor surface for adhesion and also to the fact that the chad carries away any excess adhesive as the chad is removed.

The chad is removed by a chad removal means which may comprise a vacuum/pressure roll over which the composite web is rolled after completion of the laminating process. The vacuum pressure roll may comprise gas ports in the surface thereof for alternately applying a vacuum and then pressurized air. The vacuum/pressure roll engages the paper side of the composite as it passes over a vacuum portion of the vacuum/pressure roll. The vacuum exerted through the roll gas ports retains the chad on the roll surface after the rest of the composite web passes off the roll. Pressurized air forced through the ports subsequent to application of the vacuum causes the chad to be blown off the roll into a waste receiving means. In one embodiment, the composite web is passed over a small diameter breaker roll means for the purpose of breaking most of the perforation to facilitate the chad removal.

Thus a laminated composite is formed having spaced apart clear window portions therein. The composite may be collected on a composite take up means, for storage or shipping, or may be fed into other processing apparatus for further processing leading to a finished product such as container boxes or the like.

BRIEF DESCRIPTION OF THE DRAWING

An illustrative and presently preferred embodiment of the invention is shown in the accompanying drawing in which:

FIG. 9 is a table which defines certain symbols used in FIGS. 7 and 8.

DETAILED DESCRIPTION OF THE INVENTION

Figure 1:
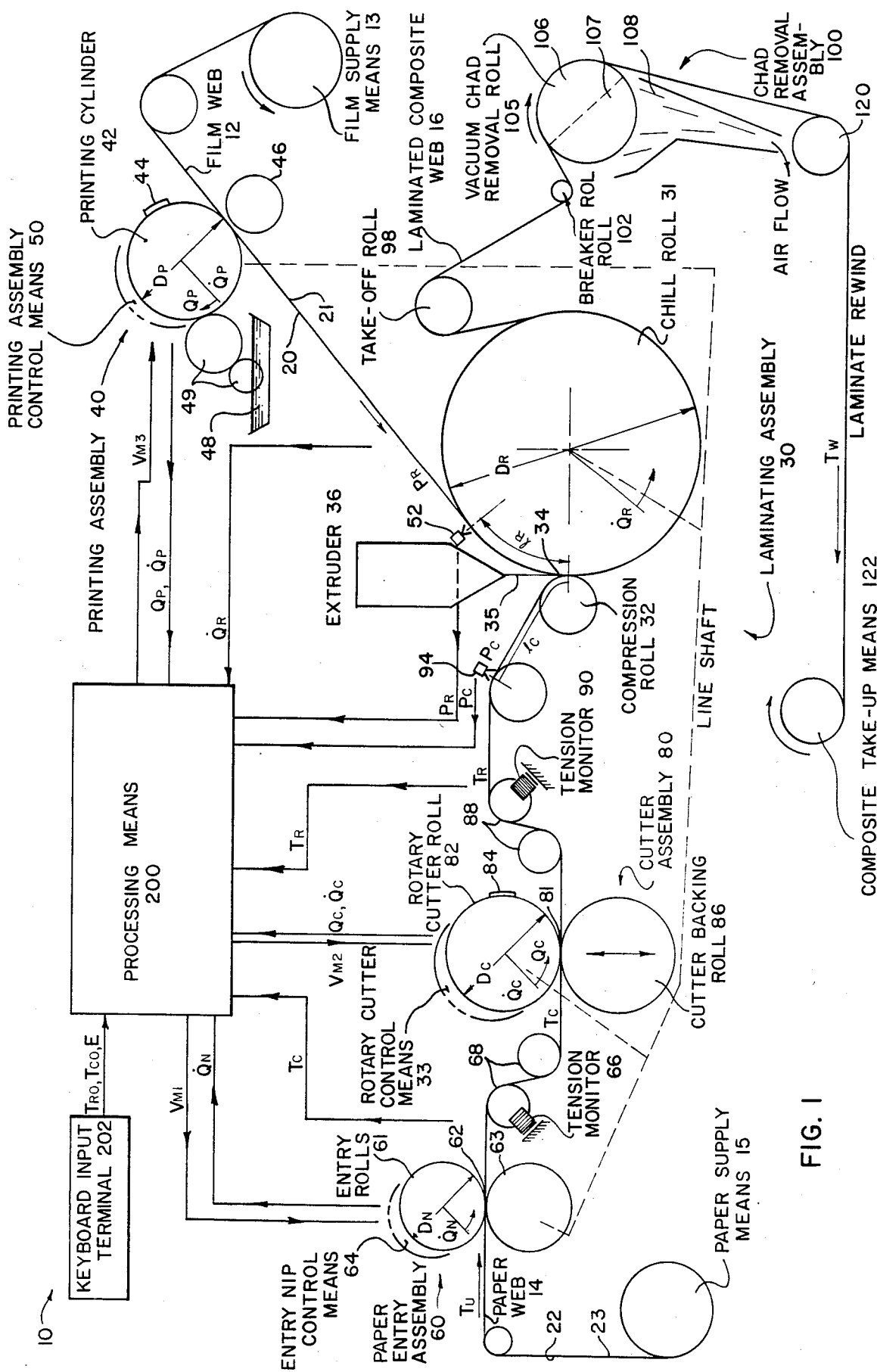
FIG. 1 is a schematic illustration showing the basic structure and operation of a die cut window laminating device.

The general layout and control functions of the die cut window laminating device 10 of the present invention are illustrated schematically in FIG. 1. A continuous plastic film web 12 is provided to the device 10 from a film supply means 13 such as a film unwind spool. For reference herein, the film supply means 13 will define an upstream direction with reference to the film web 12. The film 12 is drawn from the supply means 13 by laminating roll means such as laminating assembly 30. A paper web 14 supplied from a paper supply means 15 such as a paper unwind spool is also provided to the laminating assembly 30. For reference herein the paper supply means will define the upstream position of the paper web 14. The paper web 14 and film web 12 are bonded together by the laminating means to form a laminated composite web 16 which is advanced through the device 10 by a transport means such as composite takeup means 122 which may be a takeup spool.

The film web 12 has an inside surface 20, which may be printed with graphics and the like, and an outside surface 21. Various types of film may be used with the device 10 with varying degrees of success, depending largely on the extensibility of the film. In a preferred embodiment, relatively stable films such as oriented polypropylene or polyester are used. The paper has an inside surface 22 and an outside surface 23. Many types of paper material including less expensive paper such as Kraft ® linerboard or recycle folding chip board may be used in the paper web 14 due to the fact that film graphics and metalized covering hide paper flaws and also, because the plastic film web provides a significant portion of the tensile strength and tear resistance needed in the composite.

The laminating assembly 30 in the preferred embodiment comprises a main chill roll 31 which is rotated by conventional rotary connection to a main line shaft as described in further detail hereinafter. The chill roll 31 has a relatively large diameter relative to the other rolls described herein for the purpose of providing a large surface area for making heat transferring contact with a laminated composite web 16 formed from the film web 12 and paper web 14. A compression roll 32 is mounted in compressive contact with the chill roll 31 for the purpose of providing a laminating nip 34. The laminating nip 34 serves the dual purpose of drawing the film web 12 and paper web 14 therethrough at a constant speed and of compressing these two webs for the purpose of forming a smooth flat laminated composite 16.

Immediately prior to infeed of the film web 12 and paper web 14 into the laminating nip 34 at least one inside surface 20, 22 of the two webs 12, 14 is coated with an adhesive agent such as hot melt 35 provided from an adhesive supply means such as extruder 36 positioned above the laminating nip. In the presently preferred embodiment, hot melt is provided to both inside surfaces 20, 22 simultaneously. In the preferred embodiment the hot melt 35 comprises low density polyethylene provided to the two inside surfaces 20, 22 at a temperature of approximately 620° F. The film and paper webs 12, 14 after being compressed in the laminating nip 34 are rotated in non-slipping contact with the chill roll 31 over approximately two-thirds the surface thereof before passing to an idler take off roll 98. During the period of contact with the chill roll 31 the laminated composite 16 formed from the paper, film, and hot melt is cooled by heat transfer through the surface of the chill roll 31. This cooling may be provided by conventional means such as a cooling water system or the like within the chill roll 31. In one preferred embodiment, the chill roll may comprise conventionally available apparatus such as those manufactured by Webex, Inc.

Figure 2:
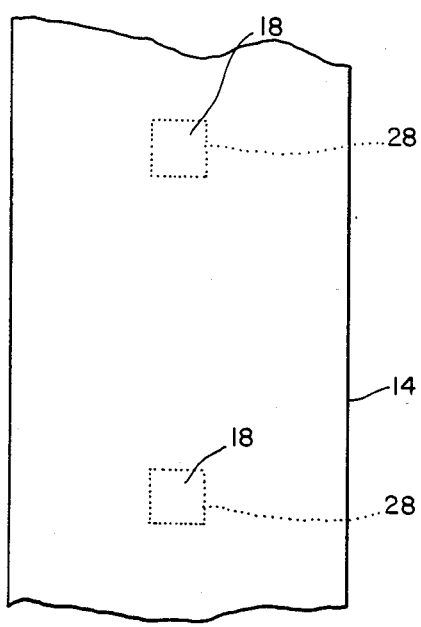
FIG. 2 is a plan view of a portion of a film web and a portion of a paper web used in a die cut window laminating device to form laminated composite.

Prior to entry of the film web 12 into the laminating nip predetermined portions of the film web referred to hereinafter as target areas 24, FIG. 2, are wetted with a wetting agent 48 provided by a wetting means to prevent adhesion of the adhesion agent to the target areas 24. In the presently preferred embodiment a hexane solvent or a solution consisting of water and alcohol may be used as a wetting agent. The wetting means used to place the wetting agent 48 on the film web 12 may be a printing means such as printing assembly 40 illustrated in FIG. 1. Other wetting means such as spray devices and the like might also be used and are within the scope of the present invention. The printing assembly 40 comprises a printing cylinder 42 having a raised printing surface 44 which makes periodic engagement with the film web 12. In a preferred embodiment shown in FIG. 2, the film web 12 is provided with a repeating series of graphics 25, each set of graphics 25 having a fixed repeat length 26 which is equal to the exterior circumference of the printing cylinder 42. Thus in an "ideal" situation with no slippage or stretch in the film web 12 relative the cylinder 42, the printing cylinder 42 would mark each repeating set of graphics in exactly the same position. The wetting agent 48 is carried to the printing cylinder 42 by conventional transfer rollers 49. The printing assembly 40 may comprise a conventional flexo-printing assembly such as Single Color Flexo Printing Stack (Model 0721) manufactured by Paper Converting, Inc. However, due to film stretch and the like, the repeat length 26 of the film graphics 25 does not remain constant and periodic minute adjustments in the rate of rotation of the printing cylinder 42 must be made in order to re-phase the cylinder for accurate wetting of the film target area 24 on each set of graphics 25. The printing cylinder contact surface 44 prints the film 12 with compressive backing force provided by periodic compressive engagement of the contact surface 44, film 12, and backing cylinder 46. The compressive engagement with backing cylinder 46 however is not of sufficient force or duration to provide a nip effect. Thus the tension within the film web 12 is not changed by the printing assembly 40. The cylinder 42 speed may be varied with respect to the film web 12 speed by wetting synchronization means to cause a slipping of the film web 12 relative to the printing cylinder 42 and backing cylinder 46 which allows the point of printing to be adjusted (re-phased) on the film web 12 without changing the advance rate of the film web 12 relative to the chill roll 31. A film monitoring means may be used to sense the relative position of the film target area 24 with respect to the printing cylinder printing surface 44. In the preferred embodiment this result is accomplished by the use of a photoelectric unit 52 which senses preprinted marks 19 on the film. The marks 19 are located in predetermined spacial relationship with the film target areas 24 as illustrated in FIG. 2. In the preferred embodiment, the photoelectric unit 52 operates in a conventional manner by sending out an electronic pulse signal in response to a disturbance in a beam of light provided by the unit. In the photoelectric unit 52 used in the present invention, the disturbance in the light beam is produced by the passage therethrough of a preprinted mark 19. The photoelectric unit 52 might be any of a number of commercially available high speed units such as MEI Services Inc.'s Scan-A-Matic Model PLM-2000. By knowing the distance between the photoelectric unit 52 and the point where raised printing surface 44 makes periodic contact with the film web 12, and by knowing the angular position of the printing surface 44 at the time a mark and associated target areas 24 are detected, the angular position of the printing cylinder 42 with respect to the film web may be adjusted to correct any error in the registry of the printing surface 44 with the target areas 24. In the preferred embodiment this result is accomplished by inputting a monitoring signal generated by the film monitoring means to a processing means 200. Cylinder 42 speed and position indication signals from printing assembly control means 50 are also input to the processing means 200 which processes the two signals and outputs a command signal to the printing assembly control means 50 which periodically adjusts the speed of the printing cylinder 42 to provide proper registry of printing surface 44 with the film web target area 34. The structure and operation of the processing means 200 and various apparatus of the printing assembly control means 50 are described in further detail hereinafter.

The method and apparatus for cutting perforated window patterns 28 in the paper web 14 and controlling the speed of advance of the perforated patterns 28 relative the laminating nip 34 for phasing the perforated patterns into proper registry with the wetted target areas 24 of the film web 12 will now be described.

Referring to FIG. 1 it will be seen that the paper web 14 passes through two separate nips: a paper entry nip 62 and a rotary cutter nip 81 prior to entering the laminating nip 34. Phasing of the perforated window patterns 28 with respect to the wetted target areas 24 is accomplished in two different modes by adjusting the paper web relative to one or both of the two nips 62, 81, as described below.

Perforated window patterns 28 are cut in the paper web 14 at predetermined spaced apart positions by a cutter means such as the cutter assembly 80 illustrated in FIG. 1. The cutter assembly 80 comprises a rotary cutter roll 82 having a raised cutting die 84 positioned on the surface thereof. A cutter backing roll 86 is positioned in selectively engageable and disengageable contact with the rotary cutter roll 82 for the purpose of providing a backing surface to allow perforated cutting of the paper web 14 by the cutting die 84 and also for the purpose of forming a cutter nip 81 for frictionally engaging the paper web 14 in nonslipping contact and drawing it through the nip 81 at a predetermined rate. The cutter backing roll 86 is disengageable with the rotary cutter roll 82 by clutch means for the purpose of removing the nip effect on the paper web 14 to allow for coarse phasing adjustment as described in further detail below. The rotary cutter roll 82 in the preferred embodiment is driven from the same line shaft as that driving the chill roll 31, and thus changes may be made in the rate of angular rotation of the rotary cutter roll 82 relative the chill roll 31 as by the use of a cutter differential motor means to add or subtract speed above a base reference speed provided by the main line shaft. The differential motor means may comprise a part of the rotary cutter control means as will be described in further detail hereinafter. The rotary cutter roll 82 has a circumference equal to that of the repeat length of the film web 12 and thus under "ideal" conditions once a perforated pattern 28 and film target area 24 were placed in proper registry at the laminating nip 34, all subsequent perforated window patterns 28 and film target areas 24 would be placed in exact registry. However, because of changes in web 12, 14 lengths, due to stretching or relaxing caused by temperature changes, inertial forces, and the like, the length of a given portion of the film web 12 or paper web 14 may vary from the ideal, thus causing a misalignment of a target area 24 and an associated perforated pattern 28. After such an error is introduced, the misregistry would repeat itself for all subsequent repeat lengths unless a correction were made. It is therefore necessary to periodically adjust the positions of perforated patterns 28 with respect to film target areas 24. This adjustment is accomplished by shifting the position of the perforated pattern "chain" on the paper web 14. As used herein, "chain" refers to a continuing series of window patterns 28 or film target areas 24 at equally spaced intervals. The apparatus and method of shifting the perforated pattern chain on the paper web 14 will now be described.

Paper entry means may comprise a paper entry assembly 60 having a pair of paper entry rolls, which may consist of a driven roll 61 and idler roll 63 positioned in compressive contact to form a paper entry nip 62. The entry nip 62 engages the paper web 14 in nonslipping frictional contact and may be used to vary the rate of paper advance therethrough. In the preferred embodiment the entry rolls 61 is conventionally attached to the main line shaft. The speed of roll 61 may be varied with respect to the speed of the main line shaft and thus chill roll 31 by entry nip control means 64 described in further detail below. A first tension monitor 66 which generates a first tension monitor signal is provided in a conventional manner such as by mounting of a stress gauge on one of two idler rolls 68 positioned in non-linear relationship between the entry nip 62 and cutter nip 81. A second tension monitor 90 which generates a second tension monitor signal may be of conventional construction similar to tension monitor 66 and may be provided and operably association with idler rolls 88 at a position between the cutter nip 81 and laminating nip 34. Thus a first tension monitoring means is provided for sensing the tension in a paper web portion positioned between the entry nip 62 and cutter nip 81 and a second tension monitoring means is provided for sensing the tension in a portion of the paper web 14 positioned between the cutter nip 81 and laminating nip 34. Tension in the portion of the paper web 14 between cutter nip 81 and laminating nip 34 is maintained at a constant value by the rotary cutter control means 33 in response to command signals from processing means 200. The processing means 200 in turn receives necessary control data for these command signals from input signals from the rotary cutter control means 33 and tension monitor 90. A perforated window pattern monitoring means 94 is positioned in fixed relationship near the laminating nip 34 for the purpose of sensing the passage of perforated window patterns on the paper web 14. A pattern monitoring signal is transmitted from the pattern monitoring means 94 to the processing means 200 wherein it is compared to a signal from the target area monitor 52 to determine the relative distances of a detected perforated pattern 28 and a detected target area 24 from the laminating nip 34. In the event that both distances are the same, no correction is required and no correction command signal will be generated by the processing means 200; however if the distances are different, then an appropriate command signal is generated by the processing means 200 to advance or retard the positioning of subsequent perforated patterns 28 relative the laminating nip 34, and associated target areas 24. The perforated window pattern monitoring means 94 may be a conventional photo electric unit such as sold by Scanning Devices, Inc., which is actuated by a light beam generated at a point on the opposite side of the paper web and which passes through the perforation of the window patterns 28 to actuate the unit.

The phasing means in the preferred embodiment comprises a coarse adjustment means and a fine adjustment means for providing proper registry of perforated window patterns 28 with target areas 24. The coarse adjustment means comprises means for increasing or decreasing the rotational speed of cutter roll 82 with respect to the rotational speed of chill roll 31 for a short "adjustment period" of time. The cutter backing roll 86 is disengaged from the cutter roll by clutch means during this adjustment period to allow the paper web 14 to "slip", with respect to the cutter nip 81. The angular position of the rotary cutter roll 82 may thus be adjusted relative the paper web 14 prior to reengagement of the cutter roll 82, and backing roll 86 to provide proper phasing of the perforated window patterns 28 and target areas 24. The coarse adjustment means is generally employed at start up or in other situations when there is a large error in phasing. However, once proper phasing has been achieved by the coarse adjustment means further minor adjustments are made by a fine adjustment means. The phasing fine adjustment means is generally employed at normal operating speeds as described below.

The perforated pattern 28 progression into the laminating nip may be advanced or retarded by the fine adjustment means by increasing or decreasing the tension in a paper web "control" portion positioned between infeed nip 62 and cutter nip 81. The fine adjustment is made during a very short period of time and causes a stretching or relaxing in the control portion of the paper web 14 prior to entry into the cutter nip 81. This control portion of the web 14 upon leaving the cutter nip 81 and encountering a different tension between cutter nip 81 and laminating nip 34 tends to either "shrink" or "relax" thus reducing or increasing the spacing between perforated window patterns 28 thereon. The effect of increasing the tension in the control portion when it is between entry nip 62 and cutter nip 81 is to decrease the pattern 28 spacing on this control portion of the paper web 14, thus shifting the entire perforated pattern chain forward relative the target area chain. Conversely, if the window pattern chain must be retarded relative the film target area chain, the tension in the paper web control portion between infeed nip 62 and cutter nip 81 is reduced relative the tension between the nip 81 and nip 34. As a result of this reduced tension or "relaxation" in the paper web between infeed nip 62 and nip 81, this control portion of the web 14 upon emergence from nip 81 tends to "stretch out" thereby increasing the distance between window patterns 28 thereon and shifting the window pattern chain backward relative the film target areas chain.

The increase or decrease of tension provided between nips 62 and 81 is produced by selectively varying the speed of paper infeed rolls 61 relative the speed of cutter rolls 82, 86 in response to processing means 200 command signals. Operation and construction of the various control means and processing means 200 are described in further detail hereinafter.

In the preferred embodiment, upon leaving the laminating means the composite web 16 passes over a chad removal means 100 for removing the portions of the paper web 14 within each perforated window pattern referred to hereinafter as "chad" 18, FIGS. 2, 3, and 4. Upon leaving the chill roll 31 the laminating composite web 16 may pass over one or more idler rolls such as take off roll 98 and passes thereafter around a breaker roll 102 having a diameter sufficiently small to break most of the perforation in the perforated window patterns 28 whereby the chad 18 is retained within the cut-out area in very fragile relationship. The composite web 16 thereafter passes over a chad removal roll. In the preferred embodiment, a vacuum chad removal roll 105 is used which contains a plurality of ports at the surface of the roll. The roll is mounted in rotating relationship to a fixed vacuum source and a fixed pressure source. The paper side of the composite web 16 is placed in contacting or near contacting relationship with the surface of the vacuum chad removal roll 105 in the vacuum portion 106 thereof. The loosely attached chad 18 is held in contacting relationship with the roll 105 and is thereby pulled away from the composite web 16 as it separates from the roll 105. As the surface of the roll 105 containing the chad 18 passes into the pressure area 107, the flow of pressurized air through the ports in the roll surface causes the chad to be discharged into discharge chute 108 where it may be collected and removed by conventional means.

The vacuum chad removal roll 105 may comprise a commercially available unit such as manufactured by Magna-Graphics or Webex. Other chad removal means such as scrapers or the like might be used in place of the vacuum chad removal roll 105 with varying degrees of success. The composite web 16 upon leaving the vacuum chad removal roll 105 may pass over a series of idler rolls 120 before being taken up for storage on a composite receiving means such as a composite wind-up roll 122. Alternatively, the laminated composite may pass directly into other apparatus such as cutting dies, creasing dies, folding apparatus and the like for further processing the laminated composite to produce an end product such as a container box or the like.

Figure 3:
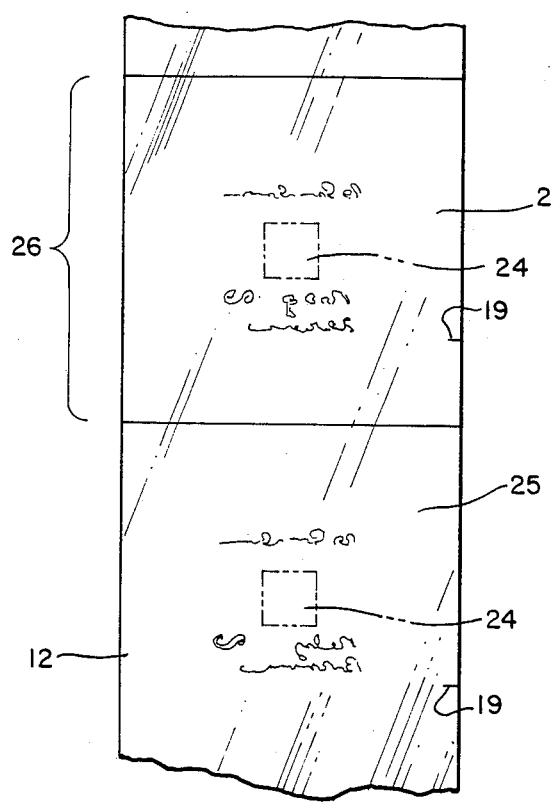
FIG. 3 is an exploded perspective view illustrating the attachment of a paper web to a film web to form a laminated composite with window portions therein.
Figure 3:
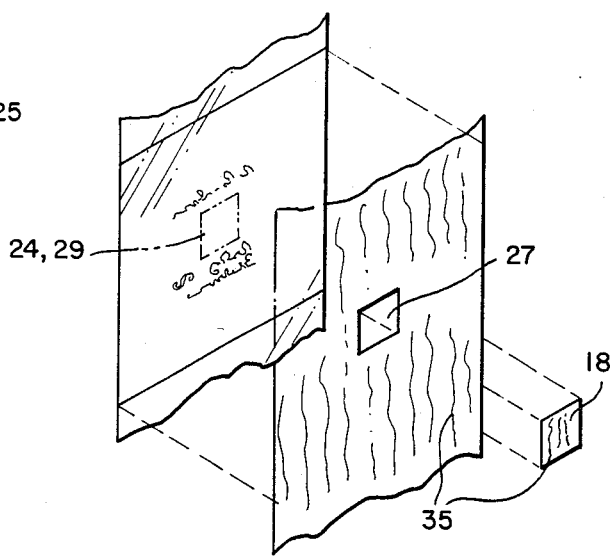
Figure 4:
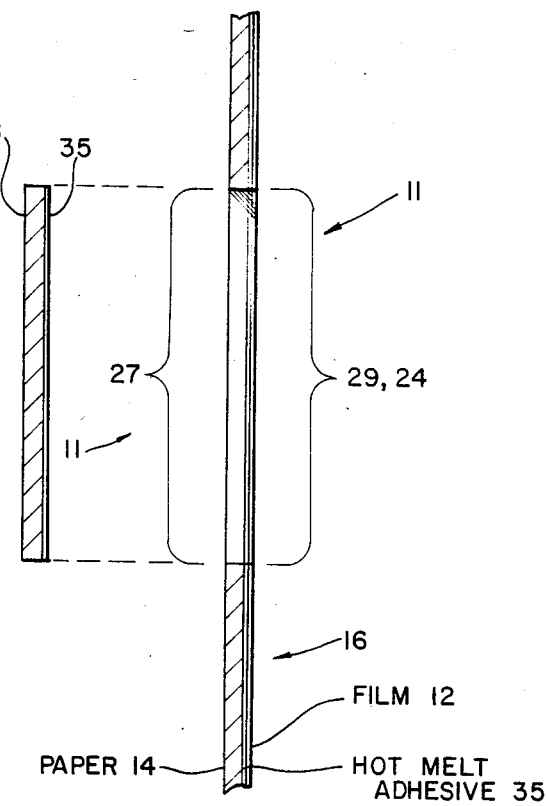
FIG. 4 is a detailed exploded elevation view illustrating the removal of a chad portion of the paper web for forming the window portion in a laminated composite.

Thus it may be seen that the described apparatus provides a laminated composite having a clear window portions 11 therein comprising window openings 27 on the paper web portion covered by a "window pane" portion 29 of the film web 12 corresponding to the wetted target area 24, FIGS. 3 and 4. The wetting solution 48 prevents the hot melt 35 or other adhesion agent from adhering to the surface of the film web 12 on the wetted target area 24 portion thereof. The hot melt adheres to the perforated window pattern portion of the paper web 14 and is carried away with the chad 18 when it is removed. The adhesive contact of the film web 12 to the remaining portions of the paper web 14 provide a sealed relationship between the film web 12 and paper web 14 about the periphery of the window opening 27 thereby forming a unitary esthetically pleasing appearance. The windows 11 thus formed enhance the value of the container by allowing a consumer to view the contents of the package.

The arrangement and operation of the various control apparatus will now be described.

Figure 5:
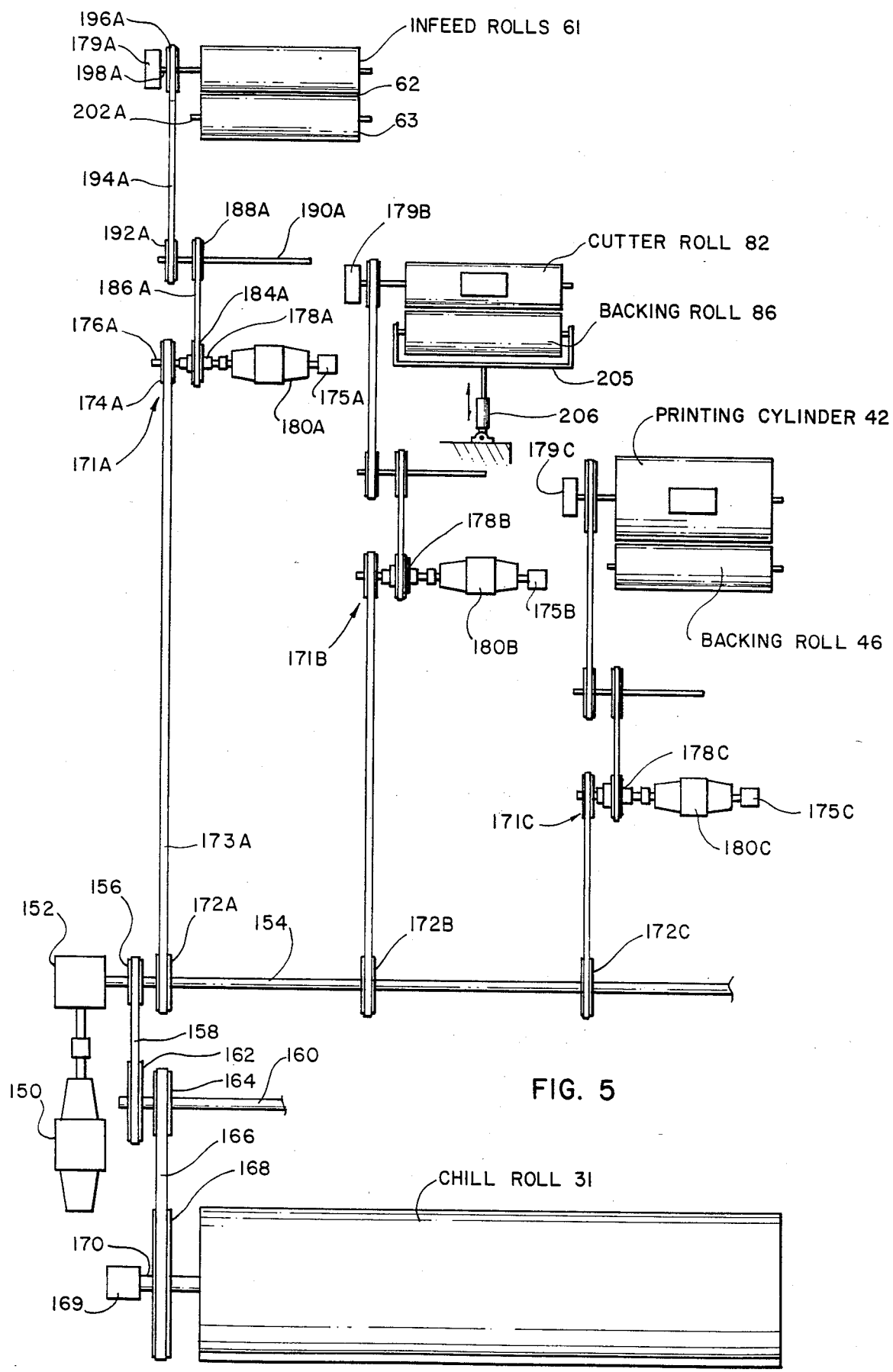
FIG. 5 is a schematic illustration showing the mechanical linkage of various moving components of a die cut window laminating device to a drive motor.

A preferred embodiment of the mechanical linkage of the die-cut window laminating device 10 is illustrated schematically in FIG. 5. A main drive means such as main drive motor 150 is operably connected to a main gear box 152 which in turn drives main drive shaft 154. Main drive shaft pulley 156 mounted on shaft 154 is connected by means of drive belt 158 to a secondary drive shaft pulley 162 coaxially mounted on secondary drive shaft 160 with pulley 164. Pulley 164 is operably connected to chill roll pulley 168 by another belt 166 whereby the chill roll 31 is rotated about chill roll drive shaft 170 which is operably mounted with tachometer 169 for sensing the speed of the chill roll 31. Entry rolls 61, 63 forming nip 62 are mechanically linked to first phase drive unit 171A and main drive motor 150 as by main drive shaft parasite pulley 172A operably connected by belt 173A to phase drive pulley 174A, in turn mounted on phase drive shaft 176A. Phase drive shaft 176A is operably connected by conventional means well known in the art to a differential unit 178A, such as for example A. Fischer, Inc., Model No. G400, having a phase drive correction pulley 184A. Phase drive correction pulley 184A is operably connected by means of a drive belt 186A to conversion pulley 188A mounted on conversion drive shaft 190 upon which infeed roll connector pulley 192A is coaxially mounted. Infeed roll belt 194A is operably connected to infeed roll pulley 196A.

Mechanical input to differential unit 178A is provided by correction trim motor 180A for the purpose of increasing or decreasing the rotation speed of phase drive correction pulley 184A. The correction motor rotational input is added or subtracted from the speed of shaft 176A by an internal differential gearing mechanism (not shown) of a type well known in the mechanical arts. Correction trim motor 180 A is actuated and controlled by correction motor control circuitry which in turn receives commands as through electrical cables (not shown) from processing unit 200 as discussed in further detail herein.

The cutter roll 82 is connected with a second phase drive unit 171B and associated linkage and the printing cylinder 42 is connected with a third phase drive unit 171C and associated linkage which may be similar or identical in connection and operation as that described above for the infeed roll 61. Thus the entry nip control means 64, the rotary cutter control means 33 and the printing assembly control means 50 may comprise first phase drive unit 171A, second phase drive unit 171B and third phase drive unit 171C respectively.

Figure 6:
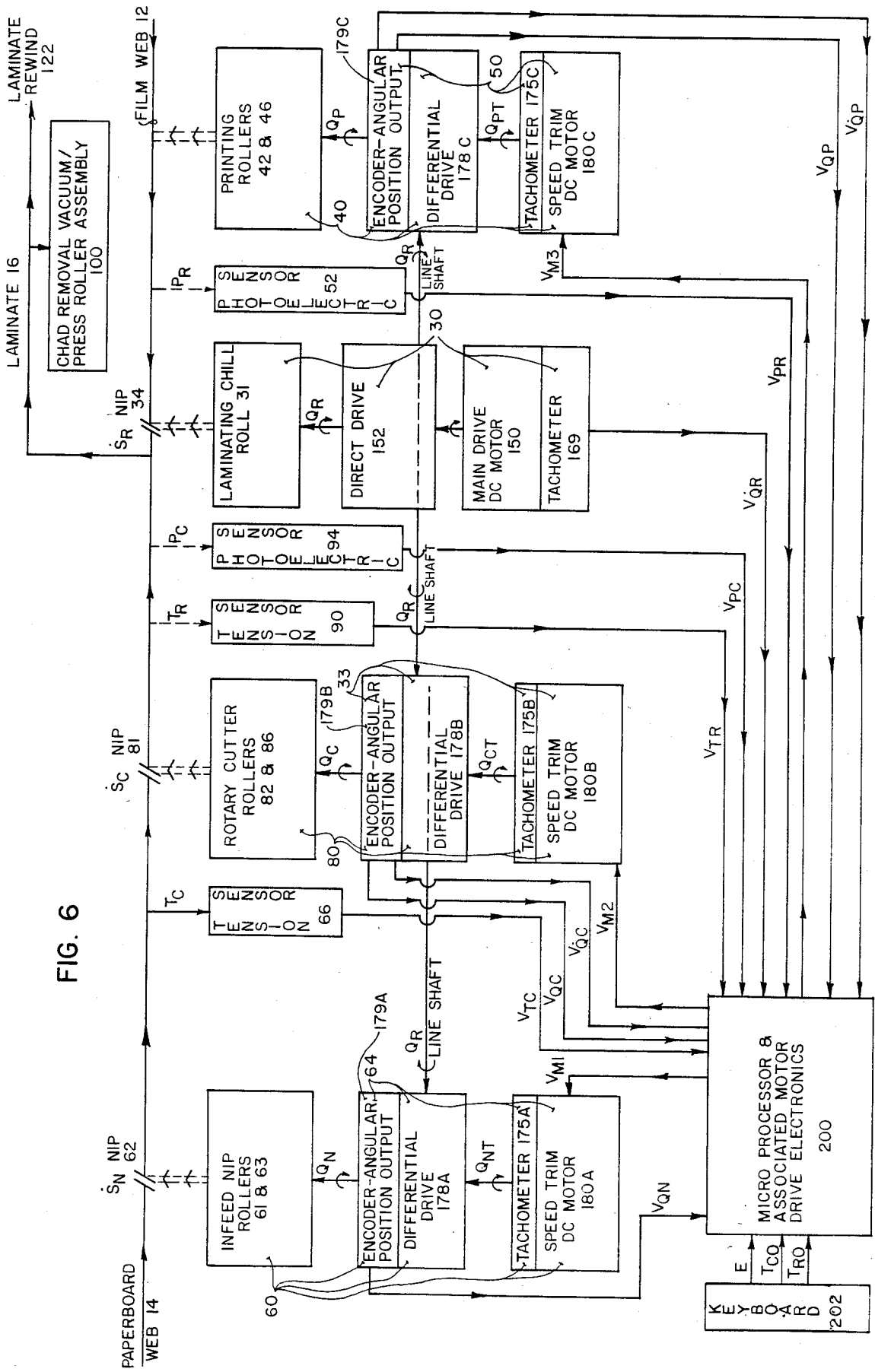
FIG. 6 is a schematic drawing showing various control means and monitoring means input and output signals used in controlling the die cut window laminating device.

As illustrated in FIGS. 1, 5 and 6, the angular speed of each trim motor 180A, 180B, 180C is monitored by an associated tachometer device 175A, 175B, 175C which feeds back a negative direct current voltage signal corresponding to its associated trim motor rate. The processing means 200 sums a positive direct current voltage with the tachometer signal. A signal generated by the sum of these two values controls the associated trim motor, driving it at a "null" speed. The trim motor null speed is the speed necessary to provide the proper angular speed in the associated rolls for proper web phasing.

An encoder device 179A, 179B, 179C is associated with each set of rolls as by mounting on the shaft of infeed roll 61, cutter roll 82, and printing cylinder 42, respectively. Each encoder device produces a series of shaft speed dependent electrical pulses which may be processed by the processing unit 200 to obtain the angular speed and position of an associated shaft. These values may in turn be used by the processing unit 200 to generate the signal which is added to an associated tachometer signal to control the speed of an associated trim motor as discussed above. Traditional tachometer resolver combination might of course also be used to obtain angular rate and position of the various shafts.

Thus the entry nip control means 64, rotary cutter control means 33, and the printing assembly control means 50 send and receive signals which are processed by processing means 200 to accomplish proper phasing in various modes.

It may be seen from FIG. 5 that backing roll 86 may be mounted on a yoke 205 or other displaceable mounting means which is in turn operably attached to an electrically actuated cylinder 206 or other displacement means. The backing roll 86 may thus be displaced in a radial direction with respect to the cutter roll 82 to allow slipping of the paper web in coarse mode adjustment as described in further detail herein.

Other phase drive units might also be used in place of those illustrated herein. For example, a "phase lock loop" control means might be used. In this type of system the infeed rolls 61, 63, the cutter roll 82, and the printing cylinder roll 42 would be electronically "locked" in proper speed and position relationship. This method of implementation requires the use of independent motors which are associated with each set of rolls being controlled, in addition to the chill roll drive motor. Digital speed and position indicators would be provided to interface each pair of shafts (chill roll, infeed roll, cutter roll, printing roll) in various combinations and would allow the "slave" shaft to be controlled as to speed and position related to an associated "master" shaft. In this method of implementation the need for differential drive units connected to a master shaft would be eliminated.

The control systems of the device 10 are shown by FIGS. 1, 6, 7 and 8. Reference letters used on the Figures refer to quantities as tabulated in Table I below.

TABLE I

| Symbol | Unit | Description |
|---|---|---|
| $T_u$ | lbs | Paper unwind tension |
| $T_o$ | lbs | Paper control tension = paper tension into cutter nip 81 (controls window/pattern registry) |
| $T_r$ | lbs | Paper reference tension = paper tension into laminating nip 34 |
| $T_w$ | lbs | Laminate winding tension |
| $\dot{Q}_n$ | Rad/sec | Infeed nip roll 61 angular rate |
| $Q_c, \dot{Q}_c$ | Rad,Rad/sec | Rotary cutter roll 82 angular position |

TABLE I-continued

| Symbol | Unit | Description |
|---|---|---|
| | | and rate, subscript "o" omdocates initial angular position |
| Qr | Rad/sec | Chill roll 31 angular rate (used as the reference rate signal) |
| Qp, Q̇p | Rad,Rad/sec | Printing Cylinder 42 angular position and rate, subscript "o" indicates initial angular position |
| $D_n$ | inches | Diameter of infeed nip roll 61 |
| $D_c$ | inches | Diameter of cutter roll 82 |
| $D_r$ | inches | Diameter of chill roll 31 |
| $D_p$ | inches | Diameter of print cylinder 42 |
| $P_r$ | seconds | Photoelectric sensor 52 sampling period with value dependent on film web line speed with a discreet signal indicating film web reference mark presence |
| $P_c$ | seconds | Photoelectric sensor 94 sampling period with value dependent on paper web line speed with a discreet signal indicating paper window pattern presence |
| E | lb/in² | Paper stiffness = Youngs modulus |
| $\dot{Q}_{c1}$ | rad/sec | Trim motor 180A angular rate, controlling infeed nip roll 61 speed |
| $\dot{Q}_{c2}$ | rad/sec | Trim motor 180B angular rate controlling rotary cutter 82 speed |
| $\dot{Q}_{c3}$ | rad/sec | Trim motor 180C angular rate, controlling print cylinder 42 speed |
| $\dot{S}_n$ | in/sec | Infeed roll 61 surface speed |
| $\dot{S}_r$ | in/sec | Surface speed of Chill roll 31 (reference speed) |
| $\dot{S}_c$ | in/sec | Rotary cutter 82 surface speed |
| $V_{c2}$ | volts | DC voltage pulse train from the absolute encoder 179B indicating angular position of cutter roll 82 |
| $V_{p2}$ | volts | DC voltage pulse train from the absolute encoder 179C indicating angular position of print cylinder 42 |
| $\dot{S}_w$ | in/sec | Film surface speed into laminating nip |
| CR | in/sec | Paper window pattern register correction rate |
| C | inches | correction of paper window pattern register |
| X | inches | Paper window pattern register error |
| $K_{pu,d}$ | lbs/in/sec | Paper relationship between draw & tension (subscript "u" increasing, "d" decreasing tension) |
| $W_{u,d}$ | rad/sec | Paper recovery break frequency ("u" increasing, "d" decreasing tension) |
| $K_{tr}$ | volts/lb | Tension transducer static gain |
| $W_3$ | rad/sec | Tension transducer break frequency |
| $V_{tr,c}$ | volts | Tension transducer output voltage subscripts "r" & "c" denote reference and control |
| $V_m$ | volts | Microprocessor D to A voltage for trim motor speed adjust "1", "2", & "3"indicate 1st, 2nd, 3rd, Motors - 180A, 180B, 180C respectively |
| $V_n$ | volts | Microprocessor bias voltage for trim motors set to achieve nominal tensions |
| $K_t$ | ft-lb/amp | Trim motor torque constant |
| $R_a$ | ohms | Trim motor armature resistance |
| $K_{fb}$ | volts | Trim motor tachometer feedback voltage |
| $J_m$ | slugs | Effective trim motor inertia |
| $K_1$ | unitless | Sheave ratio from differential output shaft through infeed nip roll |
| $K_2$ | unitless | Sheave ratio from differential output shaft through rotary cutter |
| $K_3$ | unitless | Sheave ratio between laminating chill roll through the rotary cutter differential |
| S | 1/sec | Laplace operator indicates (d/dt) |
| $l_r$ | inches | Film web distance between photo-electric sensor (52) and laminating nip 34 = reference distance |
| $l_c$ | inches | Web distance between optical sensor (Pc) and laminating nip 34 = control distance. |
| $K_4$ | unitless | Sheave ratio between laminating chill roll through the print cylinder differential |
| $K_5$ | unitless | Sheave ratio from differential output shaft through the print cylinder |
| $K_6$ | unitless | Gear ratio from trim motor shaft through the associated differential output, subscripts 1, 2 and 3 apply to the respective motors |

The meanings of various block diagram symbols are illustrated in FIG. 9. The input to microprocessor 200 and associated motor drive electronics of the various displacement, speed and acceleration values of various moving components of the device 10 and web materials moving therethrough as well as other control values relating to physical dimensions and characteristics of the devices 10 and web materials is illustrated schematically by FIG. 6.

Figure 8:
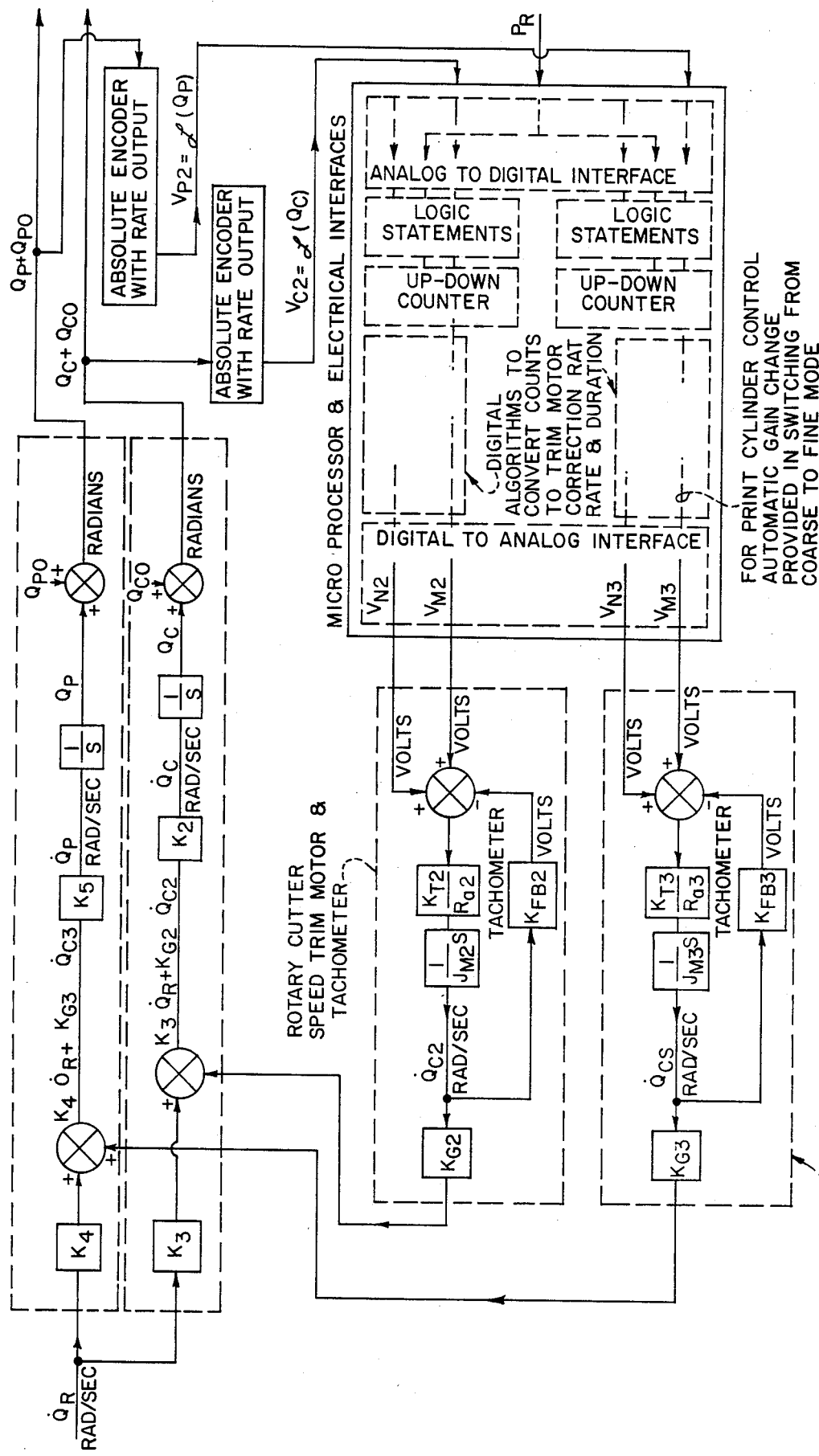
FIG. 8 is a control logic diagram for coarse adjustment mode phasing of a die cut window laminating device.

A control function logic diagram for coarse mode adjustment is illustrated in FIG. 8. The purpose of the coarse mode of control is to bring the rotary cutter and print cylinder angular position into close proximity of registration with the printed image on the film. This coarse registration could be done manually at the start of each run. However, manual phasing would be very time consuming whereas the automatic coarse adjustment of cutter and printer roll provided by the microprocessor controlled system illustrated in FIG. 8 would take less than a minute.

The cutter nip 81 would be opened during coarse adjustment. The print cylinder "nip" need not be opened because the nip of rolls 44 and 46 is insignificant. During startup of the device the web line should run at a low speed on the order of 10–20 feet per minute to allow the coarse mode of control to initiate registration without wasting material. Once the acquisition of printer and cutter phasing is accomplished, the web line speed would automatically increase and would switch control to the fine mode.

The coarse mode of control uses the optical sensor 52 as the reference for positioning both the cutter and the printing cylinders 82, 42, as indicated in FIG. 8. The input signals to the processing means 200 are the discreet signal from the optical sensor 52 and the position signal from both encoders 179B and 179C. Rate signals for control and monitoring can be derived from the position signals. The position signals from the encoders will indicate a zero or reference about which the cutter roll 82 is physically located relative the print cylinder printing pad 44. In the microprocessor control logic both the film web optical sensor and the encoder reference pulses will be compared. An up-down counter in the processor 200 will count encoder pulses (increments of angular rotation) started by either the optical sensor pulse or the absolute encoder reference pulse. If the counter was started by the optical sensor pulse, the encoder reference will stop the counter and visa versa. If the counter were started by the optical reference pulse the counter will count down and if it were started by the encoder reference pulse it will count up. The up-down count will correspond to a variation of trim motor speed increase or speed decrease to insure the fastest acquisition time. The number of counts represent a proportional angular position error of the control cylinder. In the microprocessor, the magnitude and the time of the trim motor speed change can be calculated and proportioned as a trim motor control voltage (Vm) command. From the above disclosure, it will be obvious to one skilled in the art how to provide appropriate software and electronic circuitry to accomplish coarse adjustment phasing of window patterns on the paper web to wetted target areas on the film web. It will also be obvious how to provide proper phasing of the printing cylinder 42 to target areas on the film. Such phasing requires a short term adjustment of the rotational speed of the cutter roll or printing cylinder respectively and control means for producing such speed adjustments to produce proper phasing are illustrated in FIG. 8.

Phasing in the fine adjustment mode involves a control philosophy unique to this application. Control logic for fine phasing is illustrated in FIG. 7.

paper web as it enters the cutter provides a method of continually correcting perforated pattern placement before unacceptable misregistary is created.

Figure 7:
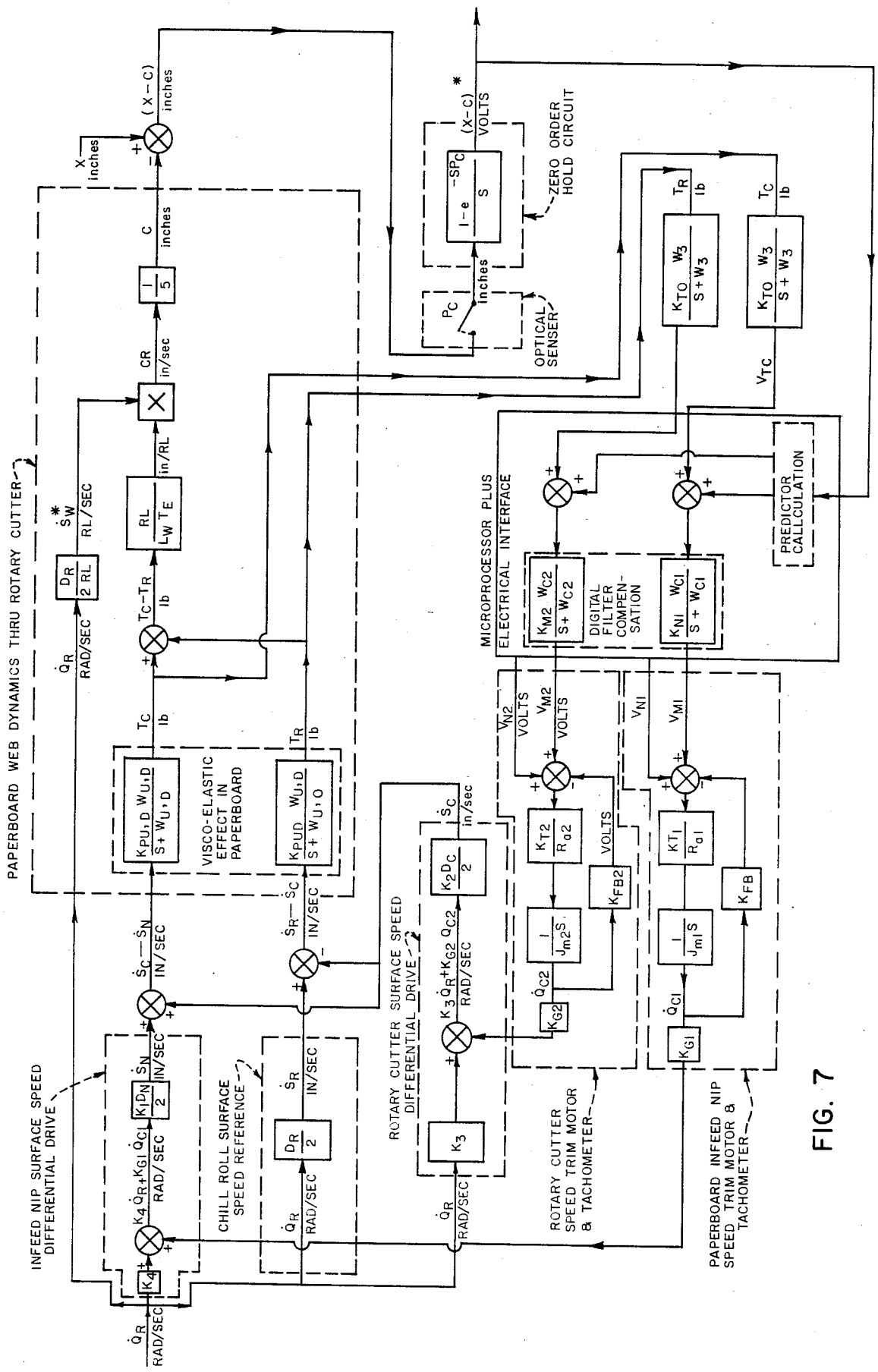
FIG. 7 is a control logic diagram for fine adjustment mode phasing of a die cut window laminating device.

The use and construction of appropriate software and circuitry for implementing the fine mode adjustment will be readily apparent to those skilled in the art from the control function diagram of FIG. 7 and the explanation of symbols found in Table I and FIG. 9. The fine mode adjustment allows the device to be operated at extremely high speeds with minimal scrap.

In one preferred embodiment of the invention the components used in the device 10 may be as indicated in Table II below.

TABLE II

| No. | Component | Supplier & General Description | |
|---|---|---|---|
| 42 | Flexo Printing Rollers | Paper Converting Machine Company 2300 S. Ashland P.O. Box 889 Green Bay, Wisconsin 54305 | |
| 105 | Chad Removal Rolls | Magna-Graphics, Inc. Industrial Park P.O. Box 987 Oconto Falls, Wisconsin 59154 | |
| 80 | Rotary Cutter | Magna-Graphics, Inc. or Industrial Park P.O. Box 987 Oconto Falls, Wis. 54154 | Aurther J. Evers Co. 1009 Broad St. Riverton, N.J. 08077 |
| 200 | Microprocessor | Texas Instruments, TI 520 Industrial Controls, MS 3516 Johnson City, Tennessee 37605-1255 | |
| 66 | Tension Sensors | Magpowr; Magnetic Power Systems, Inc. T5-500 1626 Manufacturers Dr. Fenton, Missouri 63026 | |
| 90 | Tension Sensors | Cleveland Kidder, Inc. FL IT Cleveland Machine Controls, Inc. Cleveland, Ohio | |
| 94 | Photoelectric Sensor | Scanning Devices, Inc. 3-1 226 Broadway Cambridge, Mass. 02139 | |
| 52 | Photoelectric Sensor | Scanning Devices, Inc. 3-1 226 Broadway Cambridge, Mass. 02139 S-ILED | |
| 178A,B,C | Differential Drives | Conic Systems, Conac 25 220 Fairfield Road Fairfield, New Jersey | |
| 169, | Tachometer | Reliance Electric, 5BC 46AB1901A. 24703 Euclid Avenue Cleveland, Ohio 44117 | |
| 175A,B,C | Tachometer | Reliance Electric, 5BC 46AB1901A 24703 Euclid Avenue Cleveland, Ohio 44117 | |
| 60 | Infeed Nip Roller, Assembly | Magna-Graphics, Industrial Park P.O. Box 987 Oconto Falls, Wisconsin 54154 | |

The fine control mode differs from the coarse mode of control in the number of samples selected and averaged before trim motor speed adjustment is made to correct phasing. The coarse mode "locks" at one sample whereas the fine mode may average 2, 5, or 10, etc. samples before making a phase correction. The number of samples may be set in the microprocessor as an operator input setting.

In the fine control mode tension monitors rather than encoders are used as a means of control. The rotary cutter 33 can not be rephased relative to the paperboard surface during operating conditions since it is nipping the paper. If the nip is taken away, the cutting and creasing action of the cutting cylinder 82 is lost and scrap is produced. A small amount of scrap is acceptable; however, uncut paper web creates problems in the handling of cut stock in down stream operations. Five mode error correction by stretching and relaxing the

What is claimed is:

1. A device for forming a moving web of laminated composite material having window portions therein from a moving continuous web of plastic film material and a moving continuous web of paper material said film material and said paper material each having a lamination side to be laminated to an opposed surface of the other material and a non-lamination side for forming an exterior surface of the laminated composite, said apparatus comprising:
   a. paper supply means for providing a continuous web of paper to be laminated, said paper supply means defining the upstream end of said paper web;
   b. paper transport means for moving the paper web at a predetermined speed;

c. film supply means for providing a continuous web of film to be laminated, said film supply means defining the upstream end of said film web;

d. film transport means for moving the film web into parallel aligned relationship with the paper web at a speed equal to the predetermined speed of the paper web;

e. cutter means for repeatingly cutting spaced apart perforated window patterns in said paper web, said perforated window patterns defining removeable chad portions of said paper web;

f. wetting means for wetting said film means at spaced apart target areas, said target areas having shapes substantially identical to said perforated window patterns on said paper web and having substantially identical spacing as said perforated window patterns on said paper web;

g. phasing means for providing accurate registry of said perforated window pattern portions of said paper web with said target areas on said film web;

h. adhesive supply means for applying adhesive material to at least one of said film web laminated surface and said paper web laminated surface;

i. laminating means for laminating said paper web to said film web for forming a laminated composite;

j. chad removal means for repeatingly removing said chad portions from associated window patterns whereby spaced apart window apertures are formed; and k. composite transport means for continuously moving said composite web through said apparatus.

2. The invention of claim 1 wherein said phasing means comprises:

perforated window pattern detection means positioned at a predetermined point along the paper web downstream said cutter means and upstream said laminating means for detecting the position of said perforated window patterns relative said laminating means and outputting a signal in response thereto;

target area detection means positioned at a predetermined point along said film web upstream said laminating means for detecting the position of said target areas relative said laminating means and outputting a signal in response thereto;

first processing means for receiving and processing signals from said perforated window pattern detection means and said target area detection means and providing control commands responsive to said detection means signals whereby said paper web is controlled relative said cutter means to position said perforated window patterns in registry with said target areas.

3. The invention of claim 1 further comprising wetting synchronization means for synchronizing said wetting means with said target areas on said film web whereby said target areas and only said target areas are wetted by said wetting means.

4. The invention of claim 3 wherein said wetting synchronization means comprises:

mark means on said film web positioned in predetermined spaced apart position relative said target areas; 'mark detection means positioned at a predetermined point along said film web downstream said film supply means and upstream said laminating means for detecting the passage of said mark means and generating a signal in response thereto;

wetting means control means for controlling the relative position on said film web where said wetting occurs;

processing means for processing said signal from said mark detection means and providing control commands to said wetting means control means whereby said film web is wetted only on said target areas.

5. The invention of claim 1 wherein said cutter means comprises:

a cylindrical cutter roll means for rotating a cutting die means having an axis of rotation positioned perpendicular the direction of paper web advance;

a cutting die means for cutting the paper web operably mounted on the surface of said cylindrical cutter roll means;

a cylindrical backing roll means for backing said cutting die means and for forming a cutting nip with said cylindrical cutter roll means having an axis of rotation positioned parallel the axis of rotation of said cylindrical cutter roll means;

wherein said cylindrical cutter roll means and said cylindrical backing roll means are positioned on oppsite surfaces of said paper web.

6. The invention of claim 5 wherein said cylindrical cutter roll means is driven by a cutter roll drive means and wherein said cylindrical backing roll means is radially displaceable relative said cylindrical cutter roll means whereby said paper web may be engaged by the surfaces of said cylindrical cutter roll means and said cylindrical backing roll means in a non-slipping nip relationship defining a closed state and whereby said paper web may be disengaged from the surface of said cylindrical cutter roll means and said cylindrical backing roll means whereby said paper web may pass therebetween in a slipping relationship defining an open state.

7. The invention of claim 6 wherein said phasing means comprises a course phasing means operable during a course phasing period comprising:

clutch means for moving said cutter means into said open state at the beginning of a course phasing period and for moving said cutter means into said closed state at the end of said course phasing period;

first cutter speed control means for increasing or decreasing the rotational speed of said cylindrical cutter roll means above or below a base reference speed provided by said cutter roll drive means during a portion of said course phasing period and then returning the rotational speed of said cylindrical cutter roll means to said base reference speed prior to the end of said course phasing period;

whereby the angular position of said cylindrical cutter roll means is adjustably variable relative predetermined points on said paper web during said cutter means course phasing period.

8. The invention of claim 6 further comprising rotating entry nip roll means for forming an entry nip and for engaging said paper web in nonslipping nip relationship operably positioned about said paper web upstream said cutter means said entry nip roll means being driven by an entry nip roll drive means said entry nip and said cutter nip defining opposite ends of a control strip portion on said paper web, the tension in said control strip portion being selectively controllable when said cutter means is in said closed state by controlling the speed of rotation of said nip roll means relative said cutter roll means.

9. The invention of claim 8 wherein said phasing means comprises fine phasing means operational during a fine phasing period comprising:
first tension monitor means for sensing the tension in the paper web portion positioned between said entry nip and said cutter nip and generating a first tension monitor signal in response thereto;
second tension monitor means for sensing the tension in the paper web portion positioned between said cutter nip and said laminating nip and generating a second tension monitor signal in response thereto;
said first and second monitoring signals being received and processed by processing means for processing said tension monitor signals;
said cylindrical cutter roll means being speed controlled relative said laminating means by a control signal from said processing means to provide a constant tension in the paper web portion positioned between said cutter nip and said laminating nip;
said entry nip roll means being speed controlled relative said cutter means speed by a control signal from said processing means to selectively increase or decrease the tension in a paper web control portion positioned between said entry nip and said cutter nip during said fine phasing period whereby said paper web control portion is selectively stretched or shrunk subsequent to passing through said cutter nip whereby spacing between perforated window patterns thereon is selectively controlled.

10. The invention of claim 7 further comprising rotating entry nip roll means for forming an entry nip and for engaging said paper web in nonslipping nip relationship operably positioned about said paper web upstream said cutter means said entry nip roll means being driven by an entry nip roll drive means means said entry nip and said cutter nip defining opposite ends of a control strip portion on said paper web, the tension in said control strip portion being selectively controllable when said cutter means is in said closed state by controlling the speed of rotation of said nip roll means relative said cutter roll means.

11. The invention of claim 10 wherein said phasing means comprises fine phasing means operational during a fine phasing period comprising:
first tension monitor means for sensing the tension in the paper web portion positioned between said entry nip and said cutter nip and generating a first tension monitor signal in response thereto;
second tension monitor means for sensing the tension in the paper web portion positioned between said cutter nip and said laminating nip and generating a second tension monitor signal in response thereto;
said first and second monitoring signals being received and processed by processing means for processing said tension monitor signal;
said cylindrical cutter roll means being speed controlled relative said laminating means by a control signal from said processing means to provide a constant tension in the paper web portion positioned between said cutter nip and said laminating nip;
said entry nip roll means being speed controlled relative said cutter means speed by a control signal from said processing means to selectively increase or decrease the tension in a paper web control portion positioned between said entry nip and said cutter nip during said fine phasing period whereby said paper web control portion is selectively stretched or shrunk subsequent to passing through said cutter nip whereby spacing between perforated window patterns thereon is selectively controlled.

12. A method of forming a moving web of laminated composite having window portions therein from a moving web of paper material and a moving web of film material having repeating sets of graphics thereon comprising the steps of:
a. moving the paper web at a predetermined speed;
b. moving the film web into touching parallel aligned relationship with the paper web at a speed equal to the speed of the paper web;
c. at a position on the moving film web upstream from the point of initial parallel touching contact of the two webs, wetting the film web at target areas having a repeating predetermined size and shape within each set of repeating graphics to prevent adhesion of an adhesion agent thereto;
d. at a position on the moving paper web upstream from the point of initial parallel touching contact of the two webs, cutting perforated window patterns on the moving paper web with identical shape and spacing as said wetted target areas on the moving film web;
e. periodically adjusting the position at which said perforated window patterns are cut on the moving paper web to provide accurate registry of said perforated window patterns with said target areas at the point of parallel touching contact;
f. coating at least one of the touching surfaces of the moving paper web and moving film web with an adhesive agent upstream of the point where the paper web and film web are brought into parallel touching contact;
g. compressing the moving paper web and film web at the point of parallel touching contact to form a laminated composite; and
h. removing chad portions from said perforated window patterns at a position downstream of the point of initial parallel touching contact of the two webs.

13. A method of forming a moving web of laminated composite having window portions therein from a moving web of paper material and a moving web of film material having repeating sets of graphics thereon and having target areas with a predetermined size, shape, and position within each repeating set of graphics, comprising the steps of:
a. moving the paper web at a predetermined speed;
b. moving the film web into touching parallel aligned relationship with the paper web at a speed equal to the speed of the paper web;
c. at a position on the moving paper web upstream from the point of initial parallel touching contact of the two webs, cutting perforated window patterns on the moving paper web with identical shape and spacing as said target areas on the moving film web;
d. periodically adjusting the position at which said perforated window patterns are cut on the moving paper web to provide accurate registry of said perforated window patterns with said target areas at the point of parallel touching contact;

e. coating at least one of the touching surfaces of the moving paper web and moving film web with an adhesive agent upstream of the point where the paper web and film web are brought into parallel touching contact;

f. compressing the moving paper web and film web at the point of parallel touching contact to form a laminated composite.

14. The invention of claim 13 further comprising the steps of:
   a. detecting the passage of target areas past a predetermined fixed position relative the film web upstream of the point of initial touching contact of the two webs;
   b. generating a target area monitoring signal based on the detection of the target areas;
   c. detecting the passage of perforated window patterns past a predetermined fixed position relative the paper web upstream of the point of initial touching contact of the two webs;
   d. generating a window pattern monitoring signal based on the detection of the perforated window pattern;
   e. comparing the target area monitoring signal with the window pattern monitoring signal and generating a control signal in response thereto;
   f. controlling the position at which perforated window patterns are cut on the moving paper web in response to the control signal.

15. The invention of claim 14 wherein the step of controlling the position at which perforated window patterns are cut on the moving paper web comprises the steps of:
   a. releasing the paper web from functional engagement with a cutter nip;
   b. temporarily varying the speed of a rotating cutter during a coarse adjustment period to change the relative position on the paper web at which a perforated window pattern is cut; and
   c. reengaging the paper web with the cutter nip to provide a series of equally spaced perforated window patterns at a relatively adjusted position on the paper web.

16. The invention of claim 14 wherein the step of controlling the position at which perforated window patterns are cut on the moving paper web comprises the steps of:
   a. maintaining a relatively constant tension zone in a portion of the paper web positioned between a rotating cutting nip for cutting the perforated window patterns and the point of compressing contact of the paper web with the film web;
   b. during a relatively short, fine phase adjusting period, variably adjusting the tension in a portion of the film web immediately upstream of the rotating cutting nip relative the tension in the constant tension zone whereby the paper web is correspondingly stretched or shrunk in the constant tension zone between the rotating cutting nip and the point of compression of the two webs whereby perforated patterns cut in the paper web subsequent to the short, fine phase tension adjustment period will be shifted upstream or downstream on the moving paper web relative the perforated window patterns cut prior to said fine phase tension adjustment period.

17. The invention of claim 2 further comprising wetting synchronization means for synchronizing said wetting means with said target areas on said film web whereby said target areas and only said target areas are wetted by said wetting means.

18. The invention of claim 2 wherein said cutter means comprises:
   a cylindrical cutter roll means for rotating a cutting die means having an axis of rotation positioned perpendicular the direction of paper web advance;
   a cutting die means for cutting the paper web operably mounted on the surface of said cylindrical cutter roll means;
   a cylindrical backing roll means for backing said cutting die means and for forming a cutting nip with said cylindrical cutter roll means having an axis of rotation positioned parallel the axis of rotation of said cylindrical cutter roll means;
   wherein said cylindrical cutter roll means and said cylindrical backing roll means are positioned on opposite surfaces of said paper web.

19. The invention of claim 3 wherein said cutter means comprises:
   a cylindrical cutter roll means for rotating a cutting die means having an axis of rotation positioned perpendicular the direction of paper web advance;
   a cutting die means for cutting the paper web operably mounted on the surface of said cylindrical cutter roll means;
   a cylindrical backing roll means for backing said cutting die means and for forming a cutting nip with said cylindrical cutter roll means having an axis of rotation positioned parallel the axis of rotation of said cylindrical cutter roll means;
   wherein said cylindrical cutter roll means and said cylindrical backing roll means are positioned on opposite surfaces of said paper web.

20. The invention of claim 17 wherein said cutter means comprises:
   a cylindrical cutter roll means for rotating a cutting die means having an axis of rotation positioned perpendicular the direction of paper web advance;
   a cutting die means for cutting the paper web operably mounted on the surface of said cylindrical cutter roll means;
   a cylindrical backing roll means for backing said cutting die means and for forming a cutting nip with said cylindrical cutter roll means having an axis of rotation positioned parallel the axis of rotation of said cylindrical cutter roll means;
   wherein said cylindrical cutter roll means and said cylindrical backing roll means are positioned on opposite surfaces of said paper web.

21. The invention of claim 17 wherein said wetting synchronization means comprises:
   a. mark means on said film web positioned in predetermined spaced apart position relative said target areas;
   b. mark detection means positioned at a predetermined point along said film web downstream said film supply means and upstream said laminating means for detecting the passage of said mark means and generating a signal in response thereto;
   c. wetting means control means for controlling the relative position on said film web where said wetting occurs;
   d. second processing means for processing said signal from said mark detection means and providing control commands to said wetting means control means whereby said film web is wetted only on said target areas.

22. The invention of claim 20 wherein said wetting synchronization means comprises:
   a. mark means on said film web positioned in predetermined spaced apart position relative said target areas;
   b. mark detection means positioned at a predetermined point along said film web downstream said film supply means and upstream said laminating means for detecting the passage of said mark means and generating a signal in response thereto;
   c. wetting means control means for controlling the relative position on said film web where said wetting occurs;
   d. second processing means for processing said signal from said mark detection means and providing control commands to said wetting means control means whereby said film web is wetted only on said target areas.

23. The invention of claim 18 wherein said cylindrical cutter roll means is driven by a cutter roll drive means and wherein said cylindrical backing roll means is radially displaceable relative said cylindrical cutter roll means whereby said paper web may be engaged by the surfaces of said cylindrical cutter roll means and said cylindrical backing roll means in a non-slipping nip relationship defining a closed state and whereby said paper web may be disengaged from the surface of said cylindrical cutter roll means and said cylindrical backing roll means whereby said paper web may pass therebetween in a slipping relationship defining an open state; and wherein said phasing means comprises a course phasing means operable during a course phasing period comprising:
   clutch means for moving said cutter means into said open state at the beginning of a course phasing period and for moving said cutter means into said closed state at the end of said course phasing period;
   first cutter speed control means for increasing or decreasing the rotational speed of said cylindrical cutter roll means above or below a base reference speed provided by said cutter roll drive means during a portion of said course adjustment phasing period and then returning the rotational speed of said cylindrical cutter roll means to said base reference speed prior to the end of said course phasing period;
   whereby the angular position of said cylindrical cutter roll means is adjustably variable relative predetermined points on said paper web during said cutter means course phasing period.

24. The invention of claim 23 further comprising:
   rotating entry nip roll means for forming an entry nip and for engaging said paper web in nonslipping nip relationship operably positioned about said paper web upstream said cutter means said entry nip roll means being driven by an entry nip roll drive means means said entry nip and said cutter nip defining opposite ends of a control strip portion on said paper web, the tension in said control strip portion being selectively controllable when said cutter means is in said closed state by controlling the speed of rotation of said nip roll means relative said cutter roll means; and
   wherein said phasing means comprises fine phasing means operational during a fine phasing period comprising:
   first tension monitor means for sensing the tension in the paper web portion positioned between said entry nip and said cutter nip and generating a first tension monitor signal in response thereto;
   second tension monitor means for sensing the tension in the paper web portion positioned between said cutter nip and said laminating nip and generating a second tension monitor signal in response thereto;
   said first and second monitoring signals being received and processed by processing means for processing said tension monitor signals;
   said cylindrical cutter roll means being speed controlled relative said laminating means by a control signal from said processing means to provide a constant tension in the paper web portion positioned between said cutter nip and said laminating nip;
   said entry nip roll means being speed controlled relative said cutter means speed by a control signal from said processing means to selectively increase or decrease the tension in a paper web control portion positioned between said entry nip and said cutter nip during said fine phasing period whereby said paper web control portion is selectively stretched or shrunk subsequent to passing through said cutter nip whereby spacing between perforated window patterns thereon is selectively controlled.

25. The invention of claim 18 wherein said cylindrical cutter roll means is driven by a cutter roll drive means and
   wherein said cylindrical backing roll means is radially displaceable relative said cylindrical cutter roll means whereby said paper web may be engaged by the surfaces of said cylindrical cutter roll means and said cylindrical backing roll means in a non-slipping nip relationship defining a closed state and whereby said paper web may be disengaged from the surface of said cylindrical cutter roll means and said cylindrical backing roll means whereby said paper web may pass therebetween in a slipping relationship defining an open state; and
   comprising rotating entry nip roll means for forming an entry nip and for engaging said paper web in nonslipping nip relationship operably positioned about said paper web upstream said cutter means, said entry nip roll means being driven by an entry nip roll drive means means said entry nip and said cutter nip defining opposite ends of a control strip portion on said paper web, the tension in said control strip portion being selectively controllable when said cutter means is in said closed state by controlling the speed of rotation of said nip roll means relative said cutter roll means; and
   wherein said phasing means comprises fine phasing means operational during a fine phasing period comprising:
   first tension monitor means for sensing the tension in the paper web portion positioned between said entry nip and said cutter nip and generating a first tension monitor signal in response thereto;
   second tension monitor means for sensing the tension in the paper web portion positioned between said cutter nip and said laminating nip and generating a second tension monitor signal in response thereto;

said first and second monitoring signals being received and processed by processing means for processing said tension monitor signals;

said cylindrical cutter roll means being speed controlled relative said laminating means by a control signal from said processing means to provide a constant tension in the paper web portion positioned between said cutter nip and said laminating nip;

said entry nip roll means being speed controlled relative said cutter means speed by a control signal from said processing means to selectively increase or decrease the tension in a paper web control portion positioned between said entry nip and said cutter nip during said fine phasing period whereby said paper web control portion is selectively stretched or shrunk subsequent to passing through said cutter nip whereby spacing between perforated window patterns thereon is selectively controlled.

26. A device for forming a moving web of laminated composite material having window portions therein from a moving continuous web of plastic film material and a moving continuous web of paper material said film material and said paper material each having a lamination side to be laminated to an opposed surface of the other material and a non-lamination side for forming an exterior surface of the laminated composite, said apparatus comprising:
   a. paper supply means for providing a continuous web of paper to be laminated, said paper supply means defining the upstream end of said paper web;
   b. film supply means for providing a continuous web of film to be laminated, said film supply means defining the upstream end of said film web;
   c. rotating cutter means defining a cutter nip for repeatingly cutting spaced apart perforated window patterns in said paper web, and for engaging said paper web to control the advance thereof;
   d. adhesive supply means for applying adhesive material to at least one of said film web laminated surface and said paper web laminated surface;
   e. laminating nip means for engaging and moving said paper web and said film web in parallel aligned relationship at equal speeds and for laminating said paper web to said film web for forming a laminated composite;
   f. phasing means for providing accurate registry of said perforated window pattern portions of said paper web with predetermined, spaced apart, repeating target areas on said film web at said laminating nip means;
   g. composite transport means for continuously moving said composite web from said laminating nip means.

27. A device for forming a moving web of laminated composite material having window portions therein from a moving continuous web of plastic film material and a moving continuous web of paper material said film material and said paper material each having a lamination side to be laminated to an opposed surface of the other material and a non-lamination side for forming an exterior surface of the laminated composite, said apparatus comprising:
   a. paper supply means for providing a continuous web of paper to be laminated, said paper supply means defining the upstream end of said paper web;
   b. film supply means for providing a continuous web of film to be laminated, said film supply means defining the upstream end of said film web;
   c. rotating cutter means defining a cutter nip for repeatingly cutting spaced apart perforated window patterns in said paper web, and for engaging said paper web to control the advance thereof;
   d. adhesive supply means for applying adhesive material to at least one of said film web laminated surface and said paper web laminated surface;
   e. laminating nip means for engaging and moving said paper web and said film web in parallel aligned relationship at equal speeds and for laminating said paper web to said film web for forming a laminated composite;
   f. phasing means for providing accurate registry of said perforated window pattern portions of said paper web with predetermined, spaced apart, repeating target areas on said film web at said laminating nip means;
   g. composite transport means for continuously moving said composite web from said laminating nip means;
   wherein said phasing means comprises course phasing means for use at low speeds during system start-up operations for initially phasing said perforated window patterns with said target areas comprising:
      cutter nip opening means for controllingly opening said cutter nip for releasing said paper web from engagement from said cutter nip whereby said paper web is slippingly displaceable relative said cutter nip during an open state of said cutter nip;
      cutter means speed control means for controllingly varying the surface speed of said cutter means relative the surface speed of said laminating nip during a period when said cutter nip is in said open state whereby the relative position at which perforated window patterns are cut on said paper web are controllably shifted upstream or downstream thereon.

28. The invention of claim 27 wherein said phasing means further comprises:
   a. perforated window pattern detection means positioned at a predetermined point along the paper web downstream said cutter means and upstream said laminating means for detecting the position of said perforated window patterns relative said laminating means and outputting a signal in response thereto;
   b. target area detection means positioned at a predetermined point along said film web upstream said laminating means for detecting the position of said target areas relative said laminating means and outputting a signal in response thereto;
   c. processing means for receiving and processing signals from said perforated window pattern detection means and said target area detection means and providing control commands to said cutter means speed control means responsive to said detection means signals whereby said film cutter means is controlled to position said window patterns in registry with said target areas.

29. The invention of claim 28 wherein said perforated window pattern detection means comprises:
   a. first photoelectric sensing means for sensing the passage of window patterns; and b. wherein said target area detection means comprises second photoelectric sensing means for sensing preprinted marks associated with said target area; and
c. wherein said phasing means further comprises web speed monitoring means for monitoring the speed of said web and for outputting a web speed monitoring signal to said processing means in response thereto.

30. The invention of claim 29 wherein said web speed monitoring means comprises encoder means for providing a machine speed related electronic pulse train having a frequency proportional to the rotational speed of said laminating nip means.

31. A device for forming a moving web of laminated composite material having window portions therein from a moving continuous web of plastic film material and a moving continuous web of paper material said film material and said paper material each having a lamination side to be laminated to an opposed surface of the other material and a non-lamination side for forming an exterior surface of the laminated composite, said apparatus comprising:
   a. paper supply means for providing a continuous web of paper to be laminated, said paper supply means defining the upstream end of said paper web;
   b. film supply means for providing a continuous web of film to be laminated, said film supply means defining the upstream end of said film web;
   c. rotating cutter means defining a cutter nip for repeatingly cutting spaced apart perforated window patterns in said paper web, and for engaging said paper web to control the advance thereof;
   d. adhesive supply means for applying adhesive material to at least one of said film web laminated surface and said paper web laminated surface;
   e. laminating nip means for engaging and moving said paper web and said film web in parallel aligned relationship at equal speeds and for laminating said paper web to said film web for forming a laminated composite;
   f. phasing means for providing accurate registry of said perforated window pattern portions of said paper web with predetermined, spaced apart, repeating target areas on said film web at said laminating nip means;
   g. composite transport means for continuously moving said composite web from said laminating nip means;
   wherein said phasing means comprises fine phasing means for use under normal speed operating condition for phasing said perforated window patterns with said target areas comprising:
      means for providing a first, controllably variable tension zone in said paper web immediately upstream of said cutter nip;
      means for providing a second tension zone of relatively constant tension between said cutter nip and said laminating nip means;
      whereby tension in said first tension zone is controllably variable relative to said tension in said second tension zone;
      whereby, during a forward phasing operation in which the tension in said second tension zone is increased above the tension in said second tension zone, relative shrinking occurs in said paper web upon passage thereof from said first tension zone to said second tension zone whereby a perforated window pattern cut in said paper web during said forward phasing operation is moved forwardly relative a perforated window pattern cut when the tensions in said first and second zones are equal;
      whereby during a rearward phasing operation in which the tension in said first tension zone is decreased below the tension in said second tension zone relative stretching occurs in said paper web upon passage thereof from said first tension zone to said second tension whereby a perforated window pattern cut in said paper web during said rearward phasing operating is moved rearwardly relative a perforated window pattern cut when the tension in said first tension zone and said second tension zone are equal.

32. The invention of claim 31 wherein said means for providing said second tension zone of relatively constant tension between said cutter nip and said laminating nip means comprise:
   said laminating nip means;
   said cutting nip means;
   first tension monitoring means for monitoring the tension in said first tension zone and providing a control signal in response thereto; and
   cutter nip speed control means for controlling the speed of said cutter nip responsive to said first tension monitoring means control signal.

33. The invention of claim 32 wherein said means for providing a second controllably variable tension zone in said paper web comprises:
   said cutter nip;
   paper web entry nip means for nippingly engaging said paper web immediately upstream of said cutter nip;
   second tension zone monitoring means for monitoring the tension in said first tension zone and providing a control signal in response thereto;
   entry nip speed control means for controlling the speed of said entry nip means relative the speed of said cutter nip to provide a preselected tension in said second tension zone.

34. The invention of claim 33 wherein said phasing means further comprises:
   perforated window pattern detection means positioned at a predetermined point along the paper web downstream said cutter means and upstream said laminating means for detecting the position of said perforated window patterns relative said laminating means and outputting a signal in response thereto;
   target area detection means positioned at a predetermined point along said film web upstream said laminating means for detecting the position of said target areas relative said laminating means and outputting a signal in response thereto;
   processing means for receiving and processing signals from said detection means and said monitoring means and providing control commands to said entry nip speed control means responsive to said detection means signals and said tension monitor signals whereby said entry nip means is controlled to position said perforated window patterns in registry with said target areas.

35. A device for forming a moving web of laminated composite material having window portions therein from a moving continuous web of plastic film material and a moving continuous web of paper material said film material and said paper material each having a lamination side to be laminated to an opposed surface of the other material and a non-lamination side for forming an exterior surface of the laminated composite, said apparatus comprising:

- a. paper supply means for providing a continuous web of paper to be laminated, said paper supply means defining the upstream end of said paper web;
- b. film supply means for providing a continuous web of film to be laminated, said film supply means defining the upstream end of said film web;
- c. rotating cutter means defining a cutter nip for repeatingly cutting spaced apart perforated window patterns in said paper web, and for engaging said paper web to control the advance thereof;
- d. adhesive supply means for applying adhesive material to at least one of said film web laminated surface and said paper web laminated surface;
- e. laminating nip means for engaging and moving said paper web and said film web in parallel aligned relationship at equal speeds and for laminating said paper web to said film web for forming a laminated composite;
- f. phasing means for providing accurate registry of said perforated window pattern portions of said paper web with predetermined, spaced apart, repeating target areas on said film web at said laminating nip means;
- g. composite transport means for continuously moving said composite web from said laminating nip means;

wherein said phasing means comprises course phasing means for use at low speeds during system start-up operations for initially phasing said perforated window patterns with said target areas comprising:

cutter nip means for controllably opening said cutter nip for releasing said paper web from engagement from said cutter nip whereby said paper web is slippingly displaceable relative said cutter nip during an open state of said cutter nip;

cutter means speed control means for controllingly varying the surface speed of said cutter means relative the surface speed of said laminating nip during a period when said cutter nip is in said open state whereby the relative position at which perforated window patterns are cut on said paper web are controllably shifted upstream or downstream thereon; and wherein said phasing means comprises fine phasing means for use under normal speed operating condition for phasing said perforated window patterns with said target means comprising:

means for providing a first, controllably variable tension zone in said paper web immediately upstream of said cutter nip;

means for providing a second tension zone of relatively constant tension between said cutter nip and said laminating nip means;

whereby tension in said first tension zone is controllably variable relative to said tension in said second tension zone;

whereby, during a phasing operation in which the tension in said second tension zone is increased above the tension in said second tension zone, relative shrinking occurs in said paper web upon passage thereof from said first tension zone to said second tension zone whereby a perforated window pattern cut in said paper web during said forward phasing operation is moved forwardly relative a perforated window pattern cut when the tensions in said first and second zones are equal;

whereby during a rearward phasing operation in which the tension in said first tension zone is decreased below the tension in said second tension zone relative stretching occurs in said paper web upon passage thereof from said first tension zone to said second tension zone whereby a perforated window pattern cut in said paper web during said rearward phasing operating is moved rearwardly relative a perforated window pattern cut when the tension in said first tension zone and said second tension zone are equal.

* * * * *